Dec. 9, 1930. T. R. CLARK 1,784,045
THERMOSTAT SUPPORT
Filed Oct. 30, 1926 2 Sheets-Sheet 2
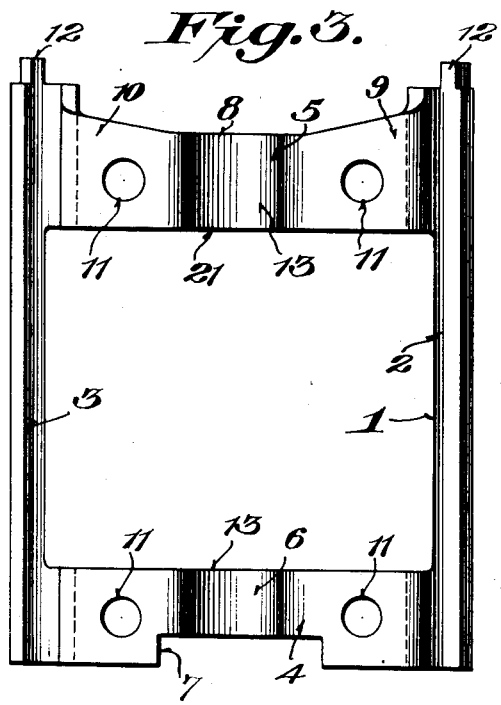
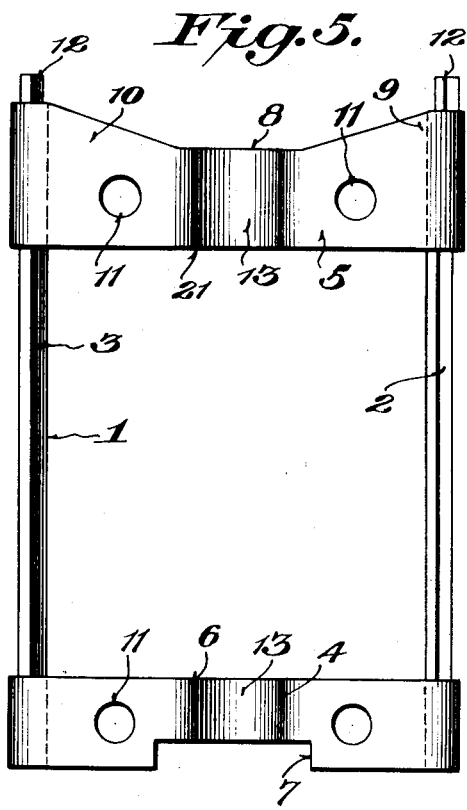
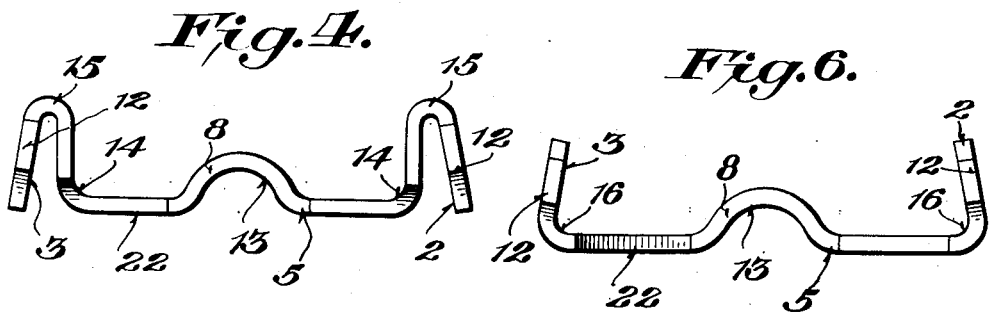
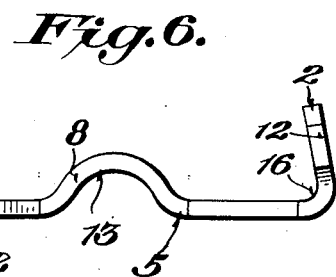

Patented Dec. 9, 1930

1,784,045

UNITED STATES PATENT OFFICE

THOMAS R. CLARK, OF KNOX COUNTY, TENNESSEE, ASSIGNOR TO THE FULTON SYLPHON COMPANY, OF KNOXVILLE, TENNESSEE, A CORPORATION OF DELAWARE

THERMOSTAT SUPPORT

Application filed October 30, 1926. Serial No. 145,342.

This invention relates to supports for thermostats, and has for an object the provision of simplified means for supporting and guiding the expansive and contractive movements of the thermostat, and also if desired, limiting the thermostat in its expansive and contractive movements.

Another object of this invention is to provide a thermostat support which is inexpensive to manufacture and easy to assemble, and which at the same time will hold the stationary end of the thermostat rigidly in fixed position while affording a positive guide, and if desired a positive stop, for the movable end of said thermostat.

Further objects will appear as the description of the invention proceeds.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to the drawings wherein the same reference characters are employed to designate corresponding parts in the several figures Fig. 1 is a perspective view of a thermostat provided with a support embodying the present invention.

Fig. 3 is a plan view of each of said halves after it is bent into shape.

Fig. 4 is an end view of the support half shown in Fig. 3.

Fig. 5 is a plan view illustrating another embodiment of the present invention showing a support half bent into a different form, and Fig. 6 is an end view of the support half shown in Fig. 5.

Figure 1:
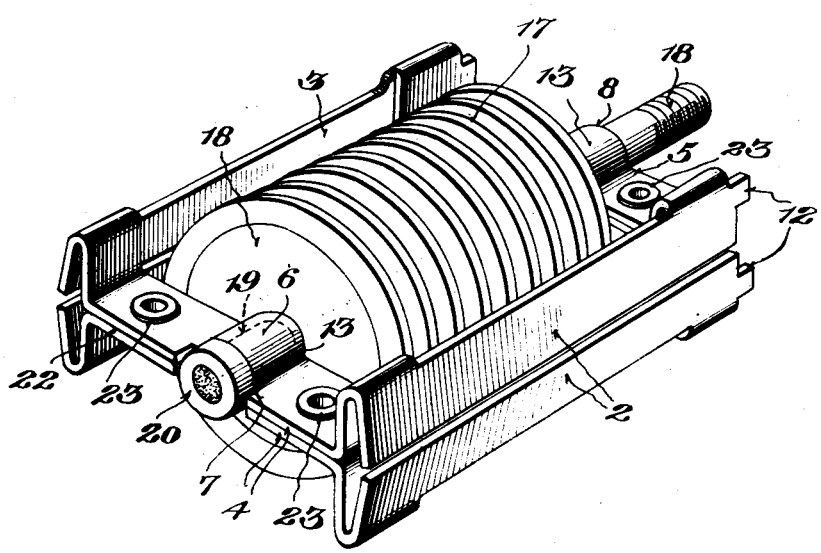

In conformity with the present invention the thermostat support is composed of a plurality of sections or pieces united in any suitable way, in a plane or planes including the axis of the thermostat to be supported, to embrace the same, or it may be the axis of a member or members connected therewith if the latter are off center with respect to the axis of the thermostat. The invention will be described by reference to embodiments composed of two sections or halves, as preferred, but it is to be understood that three or more sections may be used without departing from the broader aspects of this invention. The sections of the support are preferably identical in construction, and each section is preferably formed from a sheet metal blank. In the form shown in Fig. 2, the blank has a large, centrally arranged, generally rectangular aperture 1 so as to provide a pair of lateral portions on side members 2 and 3, of any suitable shape, which are joined at their ends by cross pieces 4 and 5, of any suitable shape. Cross piece 4 is preferably reduced in width at the central portion of its length as shown at 6, as by a notch 7 in the edge of the blank, and cross piece 5 may also be made of reduced width, at the central portion of its length, as shown at 8, although this is not necessary. Portion 8 is shown as connected to the lateral portions 2 and 3 by tapered regions 9 and 10. The cross pieces 4 and 5 are also preferably provided with a suitable number of apertures 11 to receive fastening elements of any suitable character, and if desired one end of the blank may be provided with tabs 12 for attaching the support to some suitable element.

Figure 2:
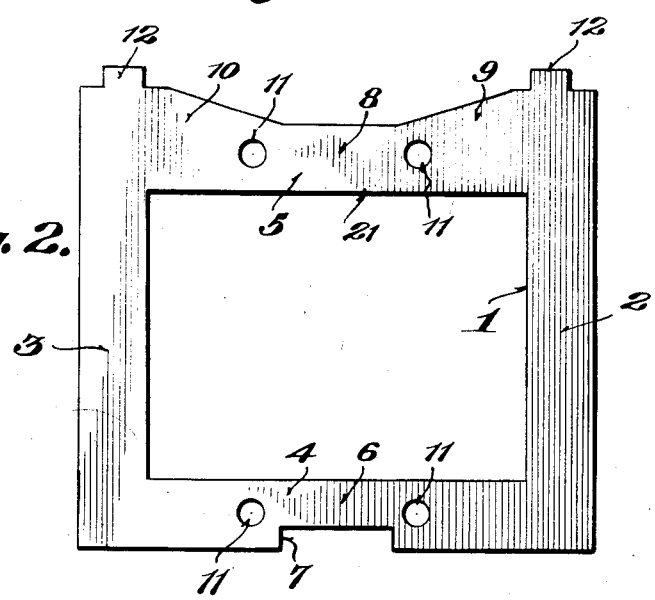
Fig. 2 is a plan view of a blank from which each of the halves of the thermostat support is formed.

Each blank, as shown in Fig. 2, is then bent into a suitable shape to constitute one half of the thermostat support. The support halves may take a variety of forms two of which have been shown on the drawings but each half is generally characterized by the bending of the centrally arranged portions 6 and 8 of the cross pieces 4 and 5 into substantially semi-circular portions 13, and the bending of the lateral portions 2 and 3 into a position at an angle to the cross pieces 4 and 5 so as to form longitudinally extending rigid elements. In the form shown in Figs. 3 and 4 the cross pieces 4 and 5 are bent at substantially ninety degrees as shown at 14, and then reversely bent, as shown at 15, adjacent the junction of said cross members with the lateral portions 2 and 3, whereby the lateral portions 2 and 3 are disposed in planes making an angle to the plane of said cross pieces. Said lateral portions 2 and 3 are preferably disposed at an oblique angle, as shown in the drawings, although if desired they may be bent into a right angle to the plane of the cross pieces, or into any other suitable shape to give the desired rigidity lengthwise of the support.

In the form shown in Figs. 5 and 6 the cross pieces 4 and 5 are bent through a large angle 16 adjacent the portion where they connect with the lateral portions 2 and 3 of the blank so as to dispose said lateral portions at a large angle to the plane of said cross pieces. Said lateral portions are preferably disposed obliquely to the plane of said cross pieces as shown in Figs. 5 and 6, but may be disposed at right angles to the plane of said cross pieces if desired.

The thermostat support, as shown in Fig. 1, is composed by uniting two similar halves, formed in the manner heretofore described or in any other suitable manner. The thermostat 17, which may be of any suitable construction and character known to the art, and illustrated as having a deeply-corrugated highly-flexible tubular lateral wall made preferably of resilient metal, has a stationary end member 18 and a movable end member provided with a stem 18' of any suitable character for operating a valve or other suitable device. In the form shown, end member 18 is provided with a boss 19 formed thereon or secured thereto in any suitable way and reduced in diameter intermediate its length so as to provide a head 20. The width of the reduced section 6 of cross piece 4 is such as to fit snugly between the end member 18 and the head 20 of the boss 19, and the bent sections 13 are of such size that when two of said sections are assembled together as shown in Fig. 1 they closely embrace the reduced portion of the boss 19. Similarly the bent sections 13 formed in the cross pieces 5 are of such size that when assembled as illustrated in Fig. 1, the two semicircular portions 13 form a tubular opening which acts as a guide in which the stem 18' may reciprocate. The length of the opening 1 in the blank is such as to receive the thermostat 17 between the cross pieces 4 and 5 and to permit the desired amount of expansion of the thermostat. The length of said opening 1 is preferably, though not necessarily, selected of such length that the inner edges 21 of the cross pieces 5, when bent and assembled as shown in Fig. 1, also constitute a positive stop to limit the expansive movement of the thermostat to the desired degree.

In making and assembling a structure embodying the present invention blanks of the character shown in Fig. 2 are stamped out of sheet metal and then bent in any suitable way into the forms shown on the drawings, or other suitable forms. Two pieces, or halves, so formed are then placed about the thermostat with the faces 22 of the cross pieces 4 and 5 in contact, as shown in Fig. 1, and the two halves are then secured together in any suitable way as by rivets 23 passed through the registering openings 11. In assembling the sections of this frame, the reduced portions 6 of the cross pieces 4 snugly embrace the reduced portion of the boss 19 between the stationary member 18 of the thermostat and the enlarged head 20 of the hub, and thereby fixedly position the stationary member of the thermostat. The curved portions 13 of the cross pieces 5 also embrace the stem 18' and form a guide to insure rectilinear movement of said stem and, where the lengthwise dimension of the opening 1 is so designed, said cross pieces 5 also constitute a positive stop for limiting the expansive movement of the thermostat. The lateral portions 2 and 3 of each half, which extend parallelly to the axis of the thermostat, constitute stiffening flanges which give rigidity to the support.

It will therefore be perceived that a support constructed in conformity with the present invention is composed of a frame made up of sections which meet in a plane containing the axis of the thermostat and which may be rapidly and inexpensively stamped out of sheet metal and bent into the desired shape and easily and inexpensively assembled and united in assembled relation with the thermostat. At the same time said frame is possessed of the requisite longitudinal rigidity and transverse strength, while it fixedly retains the stationary end member of the thermostat against displacement, and affords a guide and, if desired, a stop for the movable end member of said thermostat. The support for the thermostat may thus be made and assembled at a great reduction in cost of labor and materials over drawn, cast and forged supports heretofore proposed.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art, while changes may be made in details of construction, arrangement and proportion of parts without departing from the spirit of this invention.

While it is preferred to bend the blanks so as to dispose the lateral portions 2 and 3 at an angle to the plane of the cross pieces 4 and 5, as this gives a more compact structure, the lateral portions 2 and 3 may be left in the plane of said cross pieces, within the broader aspects of this invention, where space will admit of such construction, and said lateral portions will still subserve their function of stiffening flanges to give rigidity to the support. It is also to be expressly understood that while it is preferred to compose the support of two sections or halves as heretofore described, the support may be made up of a larger number of sections suitably shaped and bent so as to embrace the axis of the thermostat or elements thereon. Where reference is made in the claims to the axis of the thermostat being embraced by the sections of the support it is to be understood that this expression includes constructions wherein the sections embrace the axis of a member or members on the end walls of the thermostat if they are off center with respect to the axis of the thermostat, and whether the support is composed of two or more sections. Reference is therefore to be had to the claims hereto appended for a definition of the limits of the invention.

What is claimed is:

1. A thermostat support composed of sections formed of sheet metal and each including longitudinally extending side members connected by cross pieces provided with a bend extending in the direction of said side members at the junction of said cross pieces and side members whereby said side members constitute stiffening flanges.

2. A thermostat support composed of sections formed of sheet metal and each including longitudinally extending side members connected by cross pieces which are provided with reverse bends adjacent their ends whereby said side members constitute stiffening flanges.

3. A thermostat support composed of sections each including side members and cross pieces connecting the same, one of said cross pieces being of reduced width intermediate its length and connected to said side members by portions of tapering width.

4. A thermostat support composed of sections each including side members and cross pieces connecting the same, one of said cross pieces being notched intermediate its length.

5. A thermostat support composed of sections formed of sheet metal and each including side members and cross pieces connecting the same, the cross pieces of each section being bent into substantially semicircular form intermediate their length and angularly with respect to the plane of said cross pieces and adjacent their ends to dispose said side members at an angle to said cross pieces.

6. A thermostat support composed of sections formed of sheet metal and connectible to embrace the axis of the thermostat, each of said sections comprising longitudinally extending members and transverse connecting members bent along lines extending lengthwise of the support to dispose said longitudinally extending members at an angle to said transverse members.

7. A support for a thermostat including sections united in a plane which substantially coincides with a plane including the axis of the thermostat and having angularly disposed lateral portions which form rigid flanges on opposite sides of the thermostat, said flanges being connected by transverse portions one of which rigidly fixes the thermostat in position and each of said transverse portions being bent at an angle with respect to a plane common to said transverse portions and adjacent the junction of said transverse portions with said lateral portions to dispose said lateral portions in said angular relationship and give rigidity to said support.

8. A support for a thermostat including sections united in a plane which substantially coincides with a plane including the axis of the thermostat and having angularly disposed lateral portions which form rigid flanges on opposite sides of the thermostat, said flanges being connected by transverse portions one of which is shaped to guide the expansible and collapsible movements of the thermostat and each of said transverse portions being bent at an angle with respect to a plane common to said transverse portions and adjacent the junction of said transverse portions with said lateral portions to dispose said lateral portions in said angular relationship and give rigidity to said support.

9. A support for a thermostat including sections united in a plane which substantially coincides with a plane including the axis of the thermostat and having angularly disposed lateral portions which form rigid flanges on opposite sides of the thermostat, said flanges being connected by transverse portions one of which is so constructed as to fixedly retain the thermostat in position and the other of which is so positioned as to limit the expansive movement of the thermostat and each of said transverse portions being bent at an angle with respect to a plane common to said transverse portions and adjacent the junction of said transverse portions with said lateral portions to dispose said lateral portions in said angular relationship and give rigidity to said support.

10. A thermostat support composed of sections in the form of generally rectangular members having a central opening adapted to receive a thermostat when said members are secured together, each of said members including a pair of transverse portions shaped to provide, when said members are assembled together, a means for fixedly retaining a thermostat in position and a guide for the expansible and collapsible movements of the thermostat and each of said members also including a pair of lateral longitudinally extending portions disposed at an angle to a plane common to said transverse portions and forming stiffening flanges for the length of the support.

In testimony whereof I have signed this specification.

THOMAS R. CLARK.